July 20, 1965
C. E. THOMPSON
3,196,050
METHOD OF PREPARING A CATALYST IMPREGNATED CARBON ELECTRODE
Filed May 29, 1962
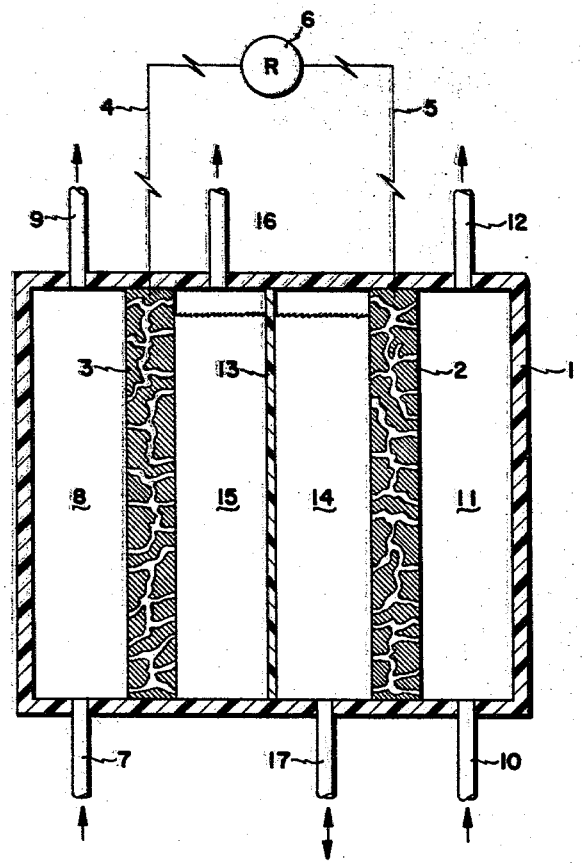
Charles E. Thompson INVENTOR
BY Olin B. Johnson
PATENT ATTORNEY United States Patent Office 3,196,050
Patented July 20, 1965

3,196,050
METHOD OF PREPARING A CATALYST IMPREGNATED CARBON ELECTRODE
Charles E. Thompson, Fanwood, N.J., assignor to Esso Research and Engineering Company, a corporation of Delaware
Filed May 29, 1962, Ser. No. 198,512
10 Claims. (Cl. 136—122)

This invention relates to direct conversion of chemical energy to electrical energy. In particular, this invention relates to novel, catalyst-bearing, nonsacrificial electrodes for use in electrochemical cells wherein a combustible material is electrochemically oxidized and to preparation of catalysts associated therewith. More particularly, the invention relates to fuel cells employing aqueous electrolytes and to the preparation of catalyst-bearing electrodes for use therein which electrodes comprise a carbon substrate upon which a noble metal catalyst is superimposed.

The term "fuel cell" is used herein and in the art to denote a device, system or apparatus wherein chemical energy of a fluid combustible fuel such as hydrogen, carbon monoxide or an organic compound containing hydrogen in its molecular structure is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode, respectively, which are separated by an electrolyte which provides ionic conductance therebetween, conduction means for electrical connection between such anode and cathode external to such electrolyte, means for admitting a fluid fuel into dual contact with the anode and electrolyte and means for admitting an oxidant into dual contact with the cathode and electrolyte. Where necessary or desired, the electrolyte compartment is divided into an anolyte compartment and a catholyte compartment by an ion-permeable partition or ion-exchange membrane. Thus, in each such cell a fuel is oxidized at the anode and an oxidant is reduced at the cathode upon receiving electrons from such cathode.

Electrodes of the type hereinbefore and hereinafter referred to are also employed in electrolytic cells which unlike the aforementioned fuel cells do not provide a net production of electrical energy but in which a combustible fuel is oxidized electrochemically at the anode thereof. In such cells a direct current of electrical energy from an external source, i.e., a fuel cell, a storage battery or an alternating current rectifier, is admitted to the electrical circuit of the cell in lieu of supplying an oxidant to the cathode as in the fuel cell operation. In such cells make-up water is added to the electrolyte while the cell is in operation.

Carbon comprising electrodes are well known in the art. Various methods have been advanced for impregnating or surfacing such electrodes with a metal catalyst that will accelerate the half-cell reaction for which the electrode is intended. Heretofore, one of the most effective methods for impregnating a carbon mass with a metal catalyst has been by soaking such mass in an aqueous solution of a water soluble compound containing in combined form the desired metal, heating the resulting mass under nitrogen, or other inert gas, at a temperature of about 700°–1000° F. to decompose the adsorbed and/or absorbed compound, and finally heating such mass in a reducing atmosphere, e.g., hydrogen, at a temperature of about 700° to 1000° F. until the adsorbed and/or absorbed metal ions are reduced to the corresponding elemental metal.

It now has been discovered that the effectiveness of electrodes prepared as above-described is surprisingly enhanced if prior to the hydrogen treating step the electrode is heated to a temperature in the range of about 600° to 900° F., preferably 700° to 850° F., in the presence of carbon monoxide and subsequently heated in the presence of hydrogen to a temperature in the range of about 1000° to 1800° F., preferably 1400° to 1700° F., and most preferably 1550° to 1650° F. The adsorbed metal compounds decompose with heat. Most, if not all, of such compounds decompose at temperatures below about 400° F. Therefore, this step can be effected either by a prior heating step or in the course of the carbon monoxide treatment. The carbon monoxide treatment is carried on until the oxygen combined with the carbon surfaces has been substantially removed or chemically changed. The time for this treatment will vary with the size of the structure. Ordinarily this will not be less than about 30 minutes and ordinarily will not exceed about 5 hours. Times in the range of 1 to 4 hours will be most commonly used to remove a major amount of such oxygen. Oxygen is present in combined form upon such carbon surfaces and is probably introduced at the time when the carbon structure is heated in carbon dioxide, oxygen or air to increase porosity prior to catalyst impregnation. This oxygen is usually found in carbonyl groups and in some instances in hydroxyl groups chemically bonded to the carbon surfaces.

Carbon electrodes may take on a variety of shapes, e.g., porous plates or cylinders, in accordance with the design of the cell wherein their use is intended. Such electrodes prior to catalyst impregnation may consist essentially of a porous carbon mass or the carbon mass may be employed on or within other supporting structures, e.g., ceramics, metals, etc.

The preparation of carbon structures for use as electrodes or electrode base materials is well known in the art and need not be discussed here in detail. They are commonly prepared by taking finely ground carbon particles, e.g., mixtures of amorphous carbon and graphite, mixing these with a suitable binder such as pitch, shaping the resulting mass into the desired final configuration and subjecting the same to high temperatures and pressures over extended periods of time. Ordinarily, the carbon mass is heated in carbon dioxide prior to catalyst impregnation to achieve the porosity desired for electrode use.

In accordance with this invention the noble metal catalysts employed are preferably platinum comprising catalysts. These include embodiments wherein platinum is the sole metal employed and those wherein one or more other metals are employed in addition to platinum. These catalysts are employed in amounts constituting in excess of about 0.1 wt. percent of the completed electrode. Ordinarily, this amount will be in the range of about 0.5 to 5.0 wt. percent, preferably about 0.7 to 2.5 wt. percent. Where more than one metal is employed the water soluble compounds containing such metals may be dissolved in a common solution, or, in the alternative, the carbon may be alternately soaked in separate solutions.

The process of this invention is applicable to both anodes and cathodes, e.g., the so-called fuel and oxygen electrodes, and provides increased effectiveness over prior processes with comparable grades of carbon impregnated with the same metals in both the oxidation of fuel and reduction of oxidant. It is particularly effective in the preparation of anodes for fuel cells and for electrolytic cells where the anode performs the same function as in the fuel cell, i.e., partial or complete oxidation of an organic fuel.

The instant process provides surprisingly high current densities under similar conditions in comparison to electrodes given the same or a lower temperature hydrogen treatment. Electrodes thus prepared exhibit a much quicker return to full open circuit potential when the load is removed from the circuit.

The accompanying drawing provides a schematic view of a simple fuel cell wherein the electrodes of this invention may be tested. Referring now to the drawing, inside vessel 1 is positioned cathode 2 and anode 3 which are electrically connected by wires 4 and 5 and resistance means 6 which is symbolic of any appliance or device utilizing direct electric current for power, e.g., a light bulb. Fuel inlet conduit 7 provides means for admitting a gaseous fuel, e.g., hydrogen, a saturated or unsaturated hydrocarbon, etc. to fueling zone 8 and thence to anode 3 and the electrolyte. Fuel exhaust conduit 9 is provided as means for releasing carbon dioxide or partial oxidation products formed in anodic oxidation of the organic fuel. Oxidant inlet conduit 10 is utilized for introducing the oxidant, e.g., air, oxygen gas, etc., to oxidant receiving zone 11 and thence to cathode 2 and the electrolyte. Cathode 2 is here shown as porous carbon plates. The carbon is impregnated with platinum and gold in accordance with the process of this invention. Oxidant exhaust conduit 12 provides exhaust means for releasing excess oxidant and unused inert gases such as nitrogen when air is used. Anode 3, the fuel electrode, is here shown as a porous carbon plate which likewise is impregnated with a platinum comprising catalyst, e.g., platinum and iridium. Here the electrolyte compartment formed by vessel 1 is divided by electrolyte partition 13 into a catholyte compartment 14 and an anolyte compartment 15. Partition 13 may be an ion-exchange membrane or suitable ion-permeable structure where it is desirable to limit migration of fuel from the anolyte to the proximity of the cathode. In other embodiments the partition may be dispensed with altogether, e.g., as where the fuel either does not reach or materially affect the cathodic half cell. Anolyte compartment 15 contains an aqueous electrolyte, e.g., sulfuric acid, phosphoric acid, potassium hydroxide, etc. Catholyte compartment 12 also contains an aqueous electrolyte which may be the same or different from that in compartment 13 and of the same or different concentration, e.g., phosphoric acid, sulfuric acid, mixtures of sulfuric acid and other acids, etc.

The invention will be more easily understood from the following examples which are for purposes of illustration only and should not be construed as limitations upon the true scope of the invention as set forth in the claims.

EXAMPLE 1

Porous carbon cylinders closed at one end and measuring 3/4" in external diameter, 1 3/4" in length and 3/16" in thickness, which previously had been heated to about 1800 to 1850° F. in a carbon dioxide atmosphere to increase the porosity thereof to about 30%, were heated to a temperature of about 750° F. in air to make the carbon surfaces more hydrophilic. They were then placed under reduced pressure, e.g., about 0.001 to .05 atmosphere, to facilitate the penetration of a treating solution through the porous structure. The cylinders were then soaked in an aqueous solution containing chloroplatinic acid and iridium trichloride. The ratio of platinum to iridium in this solution was about 9:1 and the total concentration of the two metal-containing compounds in the solution was about 5 wt. percent. The pressure was then returned to atmospheric pressure and the cylinders were soaked in the solution for about 5 to 6 hours at 180° F. The cylinders were then dried at about 230° F. overnight and then heated to about 800° F. in a carbon monoxide atmosphere for about 3 hours. One group of these electrodes was then heated in a hydrogen atmosphere for about 4 hours at a temperature of about 1600° F. A second group of these electrodes was prepared in the same manner except that the hydrogen treatment step was carried out at 1000° F. A third group of these electrodes was prepared in the same manner except that the carbon monoxide treating step was carried out at 550° F. and the hydrogen treating step was carried out at 1600° F.

Other electrodes were prepared in like manner except that in lieu of heating in carbon monoxide these electrodes were heated in a nitrogen atmosphere at 900° F. and subsequently heated in a hydrogen atmosphere at a variety of temperatures.

These electrodes were then tested as anodes or fuel electrodes for use in a fuel cell. The fuel employed was ethane gas. The electrolyte employed was a 30 wt. percent aqueous solution of sulfuric acid maintained at a temperature of 180° F. at about 1 atmosphere. The comparative results of the performance of these electrodes are set froth in the following table:

*Effect of CO and $H_2$ treatment at different temperatures on carbon electrodes impregnated with platinum comprising catalysts*

| Electrode | CO Treating Temp., °F. | $N_2$ Treating Temp., °F. | $H_2$ Treating Temp., °F. | Amps./Ft.² at Indicated Polarization in Volts From Theoretical Voltage | | | | |
|---|---|---|---|---|---|---|---|---|
| | | | | 0.3 | 0.4 | 0.5 | 0.6 | 0.7 |
| A | 800 | | 1,600 | 1.6 | 6.0 | 16.0 | 21.5 | 24.3 |
| B | 800 | | 1,000 | 1.4 | 4.3 | 11.5 | 16.9 | 21.0 |
| C | 550 | | 1,600 | 0.4 | 2.0 | 6.8 | 10.9 | 14.0 |
| D | | 900 | 1,000 | 0.02 | 1.4 | 3.1 | 5.4 | 7.4 |
| E | | 900 | 1,200 | 0.1 | 1.7 | 3.4 | 7.0 | 10.8 |
| F | | 900 | 1,400 | 0.6 | 1.9 | 5.9 | 10.2 | 12.0 |
| G | | 900 | 1,600 | 0.7 | 2.2 | 6.0 | 10.4 | 12.6 |
| H | | 900 | 1,800 | 0 | 0.9 | 3.2 | 6.8 | 9.5 |
| I | | 900 | 2,000 | 0 | 0 | 0.2 | 1.3 | 2.0 |
| J | 1,000 | | 1,600 | 0.7 | 2.6 | 9.3 | 13.7 | 19.4 |

EXAMPLE 2

A porous carbon electrode was prepared by the method described in Example 1 except that the impregnating solution contained 5 wt. percent chloroplatinic acid and 0.25 wt. percent auric chloride. The total metal content of the completed electrodes was about 1 to 2 wt. percent. The electrodes were used as anodes in a fuel cell with ethane as fuel and 30% $H_2SO_4$ as electrolyte at 180° F. Current density-polarization relationships were as indicated in the following table.

*Comparative results with $H_2$ and CO treatments of fuel electrodes*

| Electrode | Gas Treat After Cat. Impregnation | Current Density in Amps/Ft.² at Indicated Polarization From Theory, Volts | | |
|---|---|---|---|---|
| | | 0.4 | 0.5 | 0.6 |
| K | $H_2$ at 1,000° F | 1.6 | 4.0 | 6.8 |
| L | $H_2$ at 1,600° F | 2.1 | 5.5 | 8.8 |
| M | CO at 800° F. and $H_2$ at 1,600° F | 9.4 | 20.2 | 23.0 |

EXAMPLE 3

Electrodes prepared as described in Examples 1 and 2 were evaluated as cathodes in a fuel cell operating at 180° F. in 30% $H_2SO_4$ with oxygen as oxidant. The superior performance of the electrodes treated at 800° F. with CO and at 1600° F. with $H_2$ are shown in the following table.

*Effect on cathode of CO and $H_2$ treatments*

| Electrode | Catalyst | Treat | Current Density in Amps/Ft.² at Indicated Polarization From Theory, Volts | | | |
|---|---|---|---|---|---|---|
| | | | 0.3 | 0.4 | 0.5 | 0.6 |
| N | Pt-Ir | $H_2$ at 1,000° F | 31 | 83 | 138 | 187 |
| O | Pt-Ir | $H_2$ at 1,600° F | 35 | 88 | 145 | 200 |
| P | Pt-Ir | CO at 800° F.+$H_2$ at 1,600° F. | 42 | 106 | 171 | 221 |
| Q | Pt-Au | $H_2$ at 1,600° F | 25 | 80 | 105 | 129 |
| R | Pt-Au | CO at 800° F.+$H_2$ at 1,600° F. | 43 | 110 | 182 | 245 |

The term "polarization" wherever employed in this specification refers to the difference between observed voltage and the voltage of a reversible electrode operating with the same reactant, temperature, pressure, and electrolyte. It does not refer to the difference between observed voltage and open circuit voltage (rest potential).

What is claimed is:

1. In the preparation of a carbon electrode impregnated with a metal comprising catalyst which preparation comprises soaking a carbon structure having oxygen chemically combined with the surfaces thereof in an aqueous solution of a metal containing water soluble compound containing said metal and subsequently heating the resulting impregnated carbon structure to decompose said compound, the improvement which comprises heating said carbon structure after impregnation at a temperature in the range of 600–900° F. in carbon monoxide until a major amount of the oxygen chemically combined with the surfaces of the carbon structure has been removed and subsequently heating the resulting structure in hydrogen gas at a temperature in the range of about 1000–1800° F. until the metal component of said compound is reduced to elemental metal.

2. A method in accordance with claim 1 which comprises heating said structure in carbon monoxide at a temperature in the range of about 700–800° F.

3. A method in accordance with claim 1 wherein said structure is heated in hydrogen gas at a temperature in the range of about 1400–1700° F.

4. A method in accordance with claim 1 wherein said structure is heated in hydrogen gas at a temperature in the range of about 1550–1650° F.

5. In the preparation of a carbon electrode impregnated with a platinum comprising catalyst which preparation comprises soaking a carbon structure in an aqueous solution of a platinum containing water soluble compound until a catalytic amount of the metal component of said compound is adsorbed on said carbon and subsequently heating the resulting impregnated carbon structure, the improvement which comprises heating said carbon structure after said impregnation at a temperature in the range of about 600–900° F. in carbon monoxide for a time in excess of about 30 minutes and subsequently heating the resulting structure in hydrogen gas at a temperature in the range of about 1400–1800° F.

6. A method in accordance with claim 3 wherein said time is in the range of about 1 to 4 hours.

7. A method in accordance with claim 5 wherein said catalyst comprises at least 0.1 wt. percent of the complete electrode.

8. In the method of preparing porous carbon impregnated with a metal comprising catalyst which comprises soaking porous carbon in an aqueous solution of a metal containing, water soluble compound and subsequently heating the resulting impregnated structure to decompose said compound, the improvement which comprises the steps of:
   (a) heating said porous carbon after impregnation at a temperature in the range of 600° to 900° F. in a carbon monoxide atmosphere, and
   (b) heating the porous carbon in a hydrogen atmosphere at a temperature in the range of about 1000° to 1800° F. until the metal component of said compound is reduced.

9. A method in accordance with claim 8 which comprises heating said porous carbon in carbon monoxide at a temperature in the range of about 700° to 800° F.

10. A method in accordance with claim 9 wherein the porous carbon is heated in hydrogen gas at a temperature in the range of about 1400° to 1700° F.

References Cited by the Examiner

UNITED STATES PATENTS

| | | | |
|---|---|---|---|
| 2,928,891 | 3/60 | Justi et al. | 136—86 |
| 2,980,749 | 4/61 | Broers | 136—86 |
| 3,077,507 | 2/63 | Kordesch et al. | 136—120 |
| 3,097,974 | 7/63 | McEvoy et al. | 136—120 |

JOHN H. MACK, *Primary Examiner.*